No. 826,762.
PATENTED JULY 24, 1906.
T. K. COLEGATE.
GARDEN CULTIVATOR.
APPLICATION FILED AUG. 8, 1905.
2 SHEETS—SHEET 1.
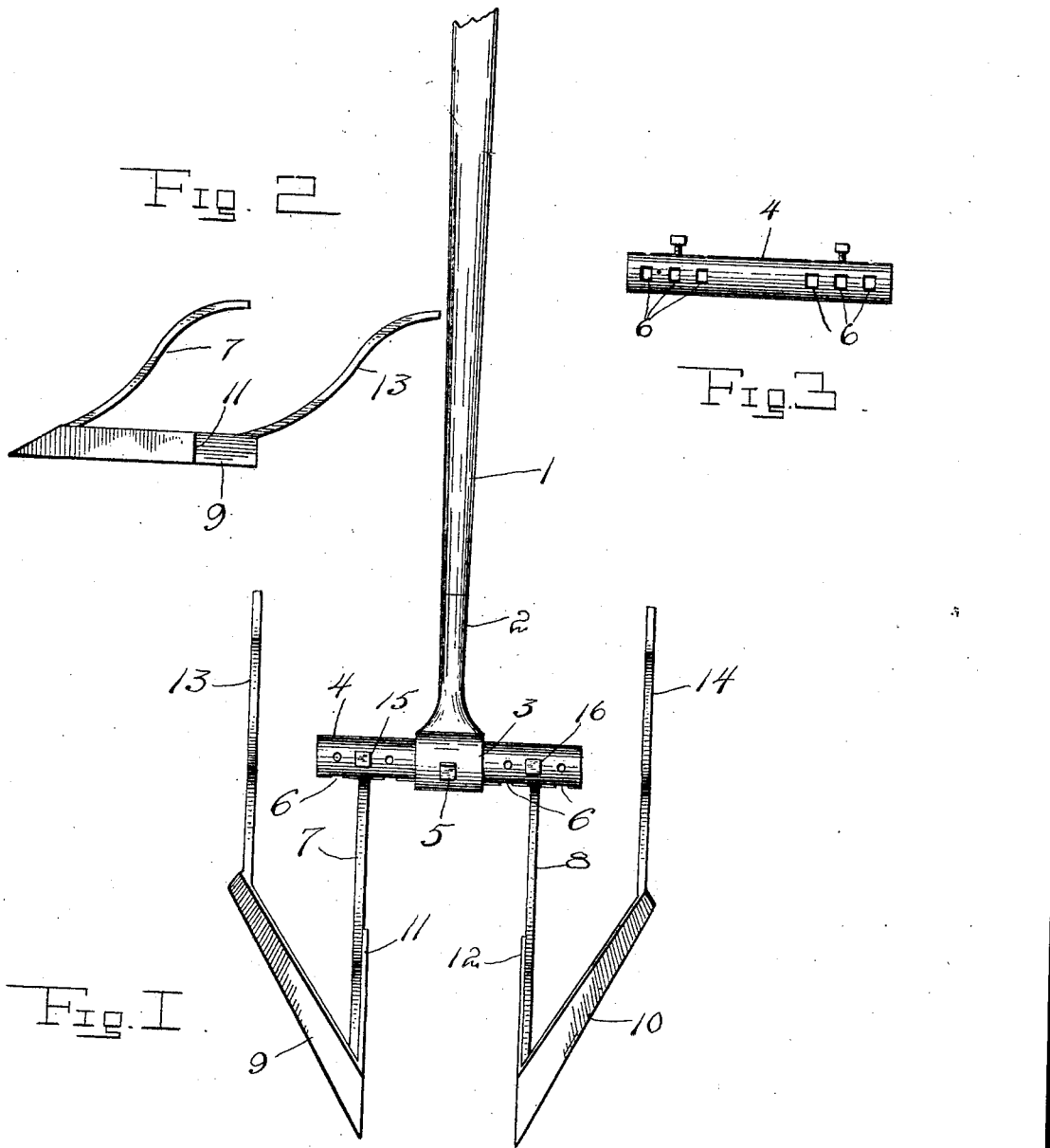
Witnesses
J. C. Simpson
E. M. Colford
Inventor
Thomas K. Colegate
By Chandlee & Chandlee
Attorneys No. 826,762. PATENTED JULY 24, 1906.
T. K. COLEGATE.
GARDEN CULTIVATOR.
APPLICATION FILED AUG. 8, 1905.
2 SHEETS—SHEET 2.
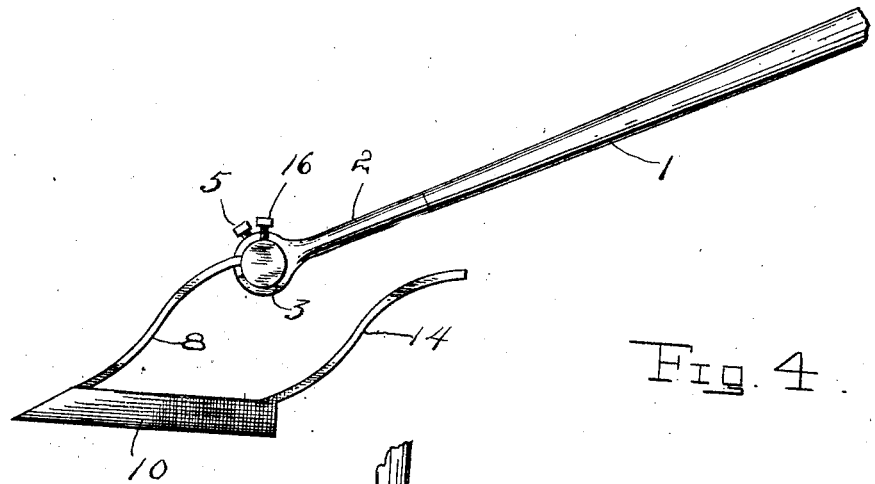
Fig. 4.
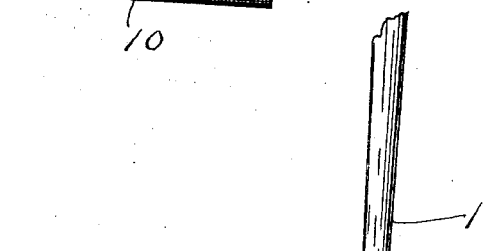
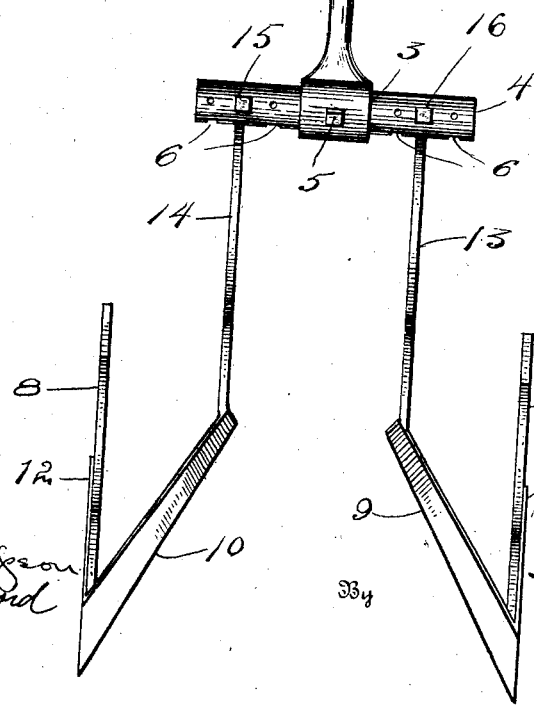
Fig. 5.
Witnesses
J. C. Simpson
C. M. Dolford
Inventor
Thomas K. Colegate.
By
Chandlee Thanake
Attorneys

UNITED STATES PATENT OFFICE.

THOMAS K. COLEGATE, OF HARVEYVILLE, KANSAS.

GARDEN-CULTIVATOR.

No. 826,762.  Specification of Letters Patent.  Patented July 24, 1906.

Application filed August 8, 1905. Serial No. 273,260.

*To all whom it may concern:*

Be it known that I, THOMAS K. COLEGATE, a citizen of the United States, residing at Harveyville, in the county of Wabaunsee, State of Kansas, have invented certain new and useful Improvements in Garden-Cultivators; and I do hereby declare the following to be a full, clear, and exact description of the invention, such as will enable others skilled in the art to which it appertains to make and use the same.

This invention relates to hand-cultivators.

One object of the invention is to provide an implement of the character stated embodying such characteristics that the blades may diverge from each other forwardly or rearwardly with respect to the handle.

Another object of the invention resides in the provision of a device of the character stated embodying such characteristics that the blades thereof will straddle the row and direct the soil outwardly or inwardly, as may be desired.

A still further object of the invention is to provide a hand-cultivator adapted to be pushed and so constructed and arranged that the handle may be raised or lowered to suit different operators.

With these and other objects in view the present invention consists in the combination and arrangement of parts, as will be hereinafter more fully described, shown in the accompanying drawings, and more particularly pointed out in the appended claims.

In the drawings, Figure 1 is a top plan view of the invention with the blades diverging rearwardly. Fig. 2 is an elevation of one of the blades. Fig. 3 is an elevation of the tubular member or head of the implement. Fig. 4 is a side elevation. Fig. 5 is a top plan view of the implement with the blades converging rearwardly.

Referring now more particularly to the accompanying drawings, the reference character 1 designates a handle having a sleeve 2 of a socket 3 secured upon its inner end in any suitable manner. It will be observed that the socket 3 is disposed at a right angle to the plane of the handle and that both ends thereof are open for the receipt of the tubular bar 4, which latter is held within the socket against accidental displacement through the instrumentality of a suitable set-screw 5. This tubular bar 4 has a series of rectangular-shaped openings 6, some of which are arranged in both ends thereof, leaving a closed space midway of its ends for the engagement of the aforesaid set-screw 5.

The rectangular openings 6 of the tubular bar 4 are designed to receive the curved shanks 7 and 8 of the blades 9 and 10, respectively, the said curved shanks being preferably rectangular in cross-section, especially at their outer ends, for engagement in the aforesaid rectangular openings of the tubular bar, the opposite ends of the said shanks being connected at the point of intersection of the respective blades with the respective landsides 11 and 12, which latter prevent the respective blades cutting too deeply into the soil. It will be understood that the shanks 7 and 8 are engaged with the tubular head or member 4 at opposite sides of the socket 3.

It will be observed that when the blades 9 and 10 are connected to the handle 1 in the manner stated they diverge from each other toward the rear of the device, the inner ends of the blades being spaced apart. If desired, the socket 3 may be rotatably adjusted upon a head or tubular member 4 after first loosening the set-screw 5 to raise and lower the handle 1 to suit different operators. Each blade 9 and 10 is provided at its outer end with auxiliary curved shanks 13 and 14, respectively, which are so formed that their free ends may be engaged in the aforesaid rectangular openings 6 of the tubular member 4. Now when these auxiliary shanks 13 and 14 are to be fitted in the tubular bar 4 the set-screws 15 and 16, which are engaged in threaded openings A in the bar at right angles to the rectangular openings and are thus designed to hold the shanks 7 and 8 against displacement with the rectangular openings 6, are loosened to permit of the disengagement of the shanks 7 and 8 from their sockets, when the auxiliary shanks 13 and 14 may be engaged in the corresponding rectangular openings 6 of the bar 4, which when done causes the blades 9 and 10 to diverge from each other forwardly of the device, it being understood that the auxiliary shanks 13 and 14 are longer than the main shanks 7 and 8.

From the foregoing it will be understood that the device straddles the row and that when the knives are pointed forwardly of the device the soil is moved outwardly and that when the blades are pointed rearwardly of the device by releasing the main shanks 7 and 8 and fitting the auxiliary shanks 13 and 14 in the tubular member the soil will be moved inwardly. The device is pushed, not pulled, and is very light to permit of ready handling, especially for the hoeing of small seeds.

What is claimed is—

1. A device of the character described comprising a member having a socket therein, a tubular member fitted in said socket and arranged at a right angle to the handle, blades each having a main and an auxiliary shank for connection interchangeably with the aforesaid tubular member, whereby the blades may be diverged rearwardly or forwardly of the device.

2. An implement of the class described comprising a head, a pair of blades each having a pair of parallel shanks with respect to which the blade is disposed obliquely, means for securing either of the corresponding shanks of the blades to the head and a handle connected to the head.

3. An implement of the class described comprising a head, a pair of blades each having a pair of parallel shanks extending rearwardly therefrom and with respect to which the blade is disposed diagonally, means for securing either pair of corresponding shanks of the two blades to the head, and a handle adjustably connected to the head for movement rotatably thereon.

In testimony whereof I affix my signature in presence of two witnesses.

THOMAS K. COLEGATE.

Witnesses
C. E. EDLIN,
H. F. THOMPSON.